United States Patent Office 3,463,639
Patented Aug. 26, 1969

3,463,639
BENZENE DIAZONIUM SALTS USEFUL IN DIAZO-TYPE MATERIALS HAVING ORTHO CARBOX-AMIDO SUBSTITUTION
Evan S. Baltazzi, Brookfield, Ill., assignor to Addressograph-Multigraph Corporation, Mount Prospect, Ill., a corporation of Delaware
No Drawing. Filed Dec. 15, 1965, Ser. No. 514,130
Int. Cl. G03c 1/54; C07c 113/04
U.S. Cl. 96—91                                9 Claims

ABSTRACT OF THE DISCLOSURE

A benzene diazonium salt having a carboxamido substituent in the 2-position, a heterocyclic tertiary amino residue to the 4-position, and a substituent other than hydrogen in the 5-position. A typical diazonium salt of this invention is one derived from a 2-(N,N-di-n-butylcarboxamido)-4-morpholino-5-methoxybenzenediazonium compound. These diazonium salts find utility in both one and two component diazotype materials.

---

This invention relates to new organic compounds. More particularly, it relates to derivatives of substituted ortho-amino benzoic acids which can be diazotized to yield light sensitive diazonium salts, and the method of preparing same.

The compounds of this invention can be illustrated by the following structural formulas:

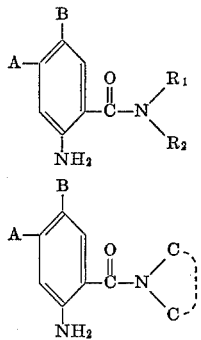

wherein A represents alkoxyl, aroxyl, acyloxyl, hydroxyl, halogen, alkyl, aryl or aralkyl; B is a secondary amine residue; and $R_1$ is lower alkyl, cycloalkyl, aryl, aralkyl or lower alkyl-substituted heterocyclic radical; $R_2$ is alkyl, cycloalkyl, aryl or aralkyl; and

is a saturated cyclic amino radical derived from aziridine, pyrrolidine, lower alkyl-substituted pyrrolidine, piperidine, lower alkyl-substituted piperidine, hexamethyleneimine, azabicyclononane, piperazine, lower alkyl-substituted piperazine, morpholine and lower alkyl-substituted morpholine.

It is an object of this invention to provide new substituted o-aminobenzamides which are useful in the production of light-sensitive diazonium salts. It is a further object to provide new diazonium salts useful in light-sensitive diazotype materials. Another object is to provide efficient methods for the production of such substituted o-aminobenzamides and light-sensitive diazonium salts. These and other objects are apparent from and achieved in accordance with the following detailed disclosure.

In the compounds of the foregoing formulas, A can represent alkoxyl groups such as methoxyl, ethoxyl, propoxyl, butoxyl and pentoxyl. Substituted alkoxyl groups are also suitable, such as ethoxyethoxyl, butoxybutoxyl and phenoxyethoxyl. A can also represent aroxyl radicals containing 6 to 10 carbon atoms such as phenoxyl, toloxyl, xyloxyl, ethylphenoxyl, butylphenoxyl and the like, as well as acycloxyl, radicals such as acetoxyl, propionoxyl butyroxyl, and the like. Halogens such as fluorine, chlorine and bromine are also represented by A. Alkyl radicals containing 1 to 5 carbon atoms, inclusive, aryl radicals containing 6 to 10 carbon atoms, inclusive, and aralkyl radicals containing 7 to 10 carbon atoms, inclusive, are also within the meaning are the substituent A. Among such aryl and aralkyl radicals are benzyl, phenethyl, tolylmethyl, phenylbutyl, xylylethyl and the like.

The secondary amino radical represented by B can be dialkylamino radical such as dimethylamino, dipropylamino, methylethylamino, methylpentylamino, ethylbutylamino, methylbenzylamino, ethylbenzylamino, methylphenethylamino, dibenzylamino, and similar secondary amino radicals containing 2 to 12 carbon atoms. Heterocyclic amino radicals of the type shown in the examples are preferred.

The radical $R_1$ can be an alkyl radical containing 1 to 5 carbon atoms, inclusive, a cycloalkyl radical such as cyclopropyl, cyclobutyl, cyclopentyl, cyclohexyl, cycloheptyl and cycloactyl or an aryl or aralkyl radical of the type described above with reference to substituent A.

The radical $R_2$ represents alkyl, cycloalkyl, aryl or aralkyl radicals of the type described above.

The compounds of the present invention can be diazotized by conventional techniques to yield stable light-sensitive diazonium salts suitable in light-sensitive coatings that may be applied to substrates such as paper, cloth or film to form light-sensitive diazotype materials. The diazonium salts are soluble in water and a spectral analysis of these materials exhibits peak absorptions in the range of 400 to 450 millimicrons. In this range of spectral sensitivity the diazotype materials derived from the amines of this invention can be processed much faster on existing diazo copying equipment and have led to simplified copying apparatus equipped with less expensive energy sources such as fluorescent and incandescent light sources.

The compounds of this invention can be prepared by reacting a 2-nitro-4-substituted-5-halobenzoyl halide with a secondary alkyl, aryl, aralkyl, or alicyclic amine to yield a 2-nitro-4-substituted-5-halobenzamide, which is reacted with a secondary amine and the resulting aminonitrobenzamide reduced to the corresponding diamonibenzamide. The substituent in the 5-position of the starting benzoyl halide corresponds to the radical B described above.

Reaction diagram:

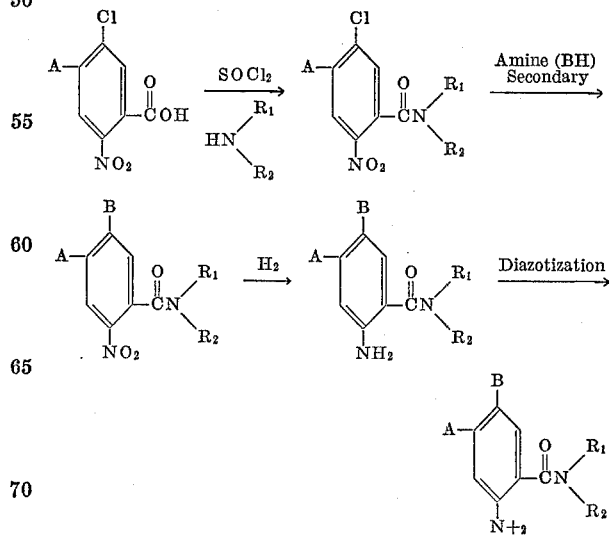

Referring to the reaction diagram, the secondary amine can be a compound having from 2 to 12 carbon atoms which is cyclic or acyclic chain.

Typical compounds prepared by the process of this invention include:

N - (2-amino-4-methoxy-5-morpolinobenzoyl)-di-n-butylamine

N - (2-amino-4-methoxy-5-hexamethyleneiminobenzoyl)-di-isobutylamine

N - (2 - amino-4-methoxy-5-morpholinobenzoyl)-3-azabicyclo[3.2.2]nonane

N - (2-amino-4-methoxy-5-piperidinobenzoyl)hexamethyleneimine

N - ethyl-N-(2 - amino-4-methoxy-5-pyrrolidinobenzoyl)aniline

N-(2-amino-4-methoxy-5-piperidinobenzoyl)morpholine

N - methyl-N-(2-amino - 4 - methoxy - 5 - hexamethyleneiminobenzoyl)tetrahydrofurfurylamine N-(2-amino-4-methoxy - 5 - pyrrolidinobenzoyl)pyrrolidine N-(2-amino-4-methoxy-5-pyrrolidinobenzoyl)piperidine N - (2-amino-4-methoxy-5-hexamethyleneiminobenzoyl)-2',6'-dimethylpiperidine N - (2 - amino-4-methoxy-5-hexamethyleneiminobenzoyl)-dicyclohexylamine N - (2 - amino-4-methoxy-5-pyrrolidinobenzoyl)diphenylamine N - isopropyl-N-(2 - amino-4-methoxy-5-pyrrolidinobenzoyl)benzylamine N - (2-amino-4-butoxy-5-morpholinobenzoyl)-di-isobutylamine N - isopropyl-N-(2 - amino-4-hydroxy-5-morpholinobenzoyl)benzylamine N - isopropyl - N - (2-amino-4-acetoxy-5-morpholinobenzoyl)benzylamine N - isopropyl-N-(2 - amino-4-ethoxyethoxy-5-morpholinobenzoyl)benzylamine N - ethyl-N-(2-amino-4-phenoxyethoxy-5-morpholinobenzoyl)aniline N - sec. butyl-N-(2 - amino - 4 - chloro-5-hexamethyleneiminobenzoyl)aniline N-(2-amino - 4 - chloro-5-piperidinobenzoyl)-di-isobutylamine.

EXAMPLE 1

Preparation of N-(2-amino-4-methoxy-5-morpholinobenzoyl)-di-n-butylamine

One hundred grams (0.43 mole) of 2-nitro-4-methoxy-5-chlorobenzoic acid (prepared by oxidation of 2-nitro-4-methoxy-5-chlorotoluene) was added to a mixture of 200 ml. of benzene and 200 ml. of thionyl chloride and the reaction mixture heated under reflux for 2 hours. The solution was evaporated and the residue was dissolved in methylene chloride (250 ml.) and cooled to 0° C. To this solution, maintained between 10–15° C., was added with stirring over a 10-minute period a solution of di-n-butylamine (125 g.) in methylene chloride (100 ml.). The solution was further stirred while at room temperature for 30 minutes. The solution was then washed with dilute hydrochloric acid and twice with water. The solution was evaporated, leaving a residue of N,N-di-n-butyl-2-nitro-4-methoxy-5-chlorobenzamide which was recrystallized from petroleum ether; M.P. 72–75° C.

The N,N - di-n-butyl-2-nitro-4-methoxy-5-chlorobenzamide (100 g.) was added to morpholine (1 liter) and the solution heated on a steam bath for 15 hours. The solution was concentrated under reduced pressure and the residue dissolved in methylene chloride, washed with dilute hydrochloric acid and twice with water. The solution was evaporated to a residue of N,N-di-n-butyl-2-nitro-4-methoxy-5-morpholinobenzamide which was recrystallized from petroleum ether; M.P. 64–68° C.

The N,N - di-n-butyl-2-nitro-4-methoxy-5-morpholinobenzamide (50 g.) was dissolved in isopropyl alcohol (400 ml.) and the solution reduced on a Parr hydrogenation apparatus at 3–4 atmospheres in the presence of Raney nickel until hydrogen uptake ceased. The mixture was filtered to remove the catalyst, the filtrate concentrated to a residue of N,N-di-n-butyl-2-amino-4-methoxy-5-morpholinobenzamide. It was recrystallized from petroleum ether; M.P. 54–56° C.

EXAMPLE 2

Preparation of N-isopropyl-N-(2-amino-4-hydroxy-5-morpholinobenzoyl)benzylamine 2-nitro-4-methoxy-5-chlorobenzoic acid (50 g.) was converted to the acid chloride by treatment with thionyl chloride, and then by treatment with isopropylbenzylamine to N - isopropyl-N-(2-nitro-4-methoxy-5-chlorobenzoyl)benzylamine, M.P. 95–100° C. Fifty grams of this compound was heated under reflux for 3 hours with morpholine (50 ml.), and the reaction mixture was separated into phenolic and non-phenolic portions, i.e., N-isopropyl-N-(2-nitro-4-hydroxy - 5 - morpholinobenzoyl)benzylamine (M.P. 211–213° C.) and N-isopropyl-N-(2-nitro-4-methoxy-5-morpholinobenzoyl)benzylamine (M.P. 168–170° C.), respectively.

Reduction of N-isopropyl-N-(2-nitro-4-hydroxy-5-morpholinobenzoyl)benzylamine with palladium on charcoal catalyst in isopropanol afforded N-isopropyl-N-(2-amino-4-hydroxy-5-morpholinobenzoyl)benzylamine, M.P. 172–173° C.

EXAMPLE 3

Preparation of N-isopropyl-N-(2-amino-4-acetoxy-5-morpholinobenzoyl)benzylamine

N-ispropyl-N-(2-nitro-4-hydroxy - 5 - morpholinobenzoyl)benzylamine (10 g.) prepared as in Example 2 was heated for 3 hours with acetic anhydride (30 ml.) and acetic acid (30 ml.) to yield 11 g. of N-isopropyl-N-(2-nitro - 4 - acetoxy - 5 - morpholinobenzyl)benzylamine M.P. 118–120° C.

Catalytic hydrogenation of this nitro compound yielded N-isopropyl-N-(2-amino-4-acetoxy - 5 - morpholinobenzoyl)benzylamine, M.P. 118–120° C.

EXAMPLE 4

Preparation of N-isopropyl-N-(2-amino-4-ethoxyethoxy-5-morpholinobenzoyl)benzylamine A solution of N-isopropyl-N-(2-nitro-4-hydroxy - 5 - morpholinobenzyl)benzylamine (10 g.) in acetone (100 ml.) was reacted with ethyl β-bromoethyl ether (10 g.) and anhydrous potassium carbonate (5 g. at 50° C. for 18 hours. The reaction product, N-isopropyl-N-(2-nitro-4-ethoxyethoxy-5-morpholinobenzoyl)benzylamine, on reduction with hydrogen gave 8.0 g. of N-isopropyl-N-(2-amino-4-ethoxyethoxy - 5 - morpholinobenzoyl)benzylamine.

EXAMPLE 5

Preparation of N-sec-butyl-N-(2-amino-4-chloro-5-hexamethyleneiminobenzoyl)aniline Following the general procedure outlined in Example 1, 2-nitro-4,5-dichlorobenzoic acid (100 g.) (produced from the corresponding 2-nitro-4,5-dichlorotoluene by oxidation) was treated with thionyl chloride and the resulting acid chloride reacted with N-sec-butylaniline. The product yielded by this reaction was 2-nitro-4,5-dichloro-N-sec-butylbenzanilide, M.P. 109–112° C.

2-nitro-4,5-dichloro-N-sec-butylbanzanilide (100 g.) was dissolved in hexamethyleneimine (1 liter) and the solution heated on a steam bath for 15 hours, yielding 2-nitro-4-chloro-5-hexamethyleneimino - N - sec-butylbenzanilide, M.P. 116–119° C.

To the 2-nitro-4-chloro-5-hexamethyleneimino-N-sec-butylbenzanilide (100 g.) was added acetic acid (500 ml.), and a solution of stannous chloride (400 g.) in concentrated hydrochloric acid (400 ml.) was gradually added while maintaining the temperature between 80° and 90° C. At the conclusion of the addition the mixture was stirred for 30 minutes, then ice was added and the mixture rendered strongly alkaline with dilute sodium hydroxide. The mixture was filtered from the precipitate which formed and washed with water. Upon evaporation the solution yielded N-sec-butyl-N-(2-amino-4-chloro-5-hexamethyleneiminobenzyl)aniline having a M.P. between 64° and 67° C.

EXAMPLES 6–20

The preparation of other compounds of this invention may be accomplished by substituting various other reactants in the general preparations set forth in Examples 1 through 5.

The following table sets forth additional compounds so produced. The various substituents corresponding to the substituents shown in the general formula are listed for each compound and the method of preparation that was followed in order to obtain the particular compound is indicated.

EXAMPLES 21–40

Preparation of the diazonium metal salt complex from each of the substituted ortho-amino-benzylamines disclosed in the above examples.

Fifty grams of the compound obtained from each of the Examples 1 through 20 was dissolved in water (74 ml.) and concentrated hydrochloric acid (75 ml.) and the solution cooled to 0° C. A 5-normal solution of sodium nitrate was slowly added while maintaining the mixture at 0° to 10° C. until the response to Green's reagent gave a persistent positive result. To the cold solution was added 50% $ZnCl_2$ solution precipitating the solid diazo complex which was filtered off, washed and dried.

Other metal halides such as tin and cadmium chlorides and bromides can be used instead of zinc chloride.

The diazonium cation may also be stabilized with reaction with mineral acid to form the diazonium sulfates and fluoroborates.

Spectral examination of the diazotized compounds of Examples 21–25 gave peak absorptions at 423, 430, 425, 425 and 410 millimicrons, respectively, and the absorption results of the remaining examples appear in the table hereinabove presented.

| Example | A | B | $R_1$ | $R_2$ | $-N\langle{}^{C-}_{C-}\rangle$ | M.P., °C. | Method of Preparation | Infrared Spectral Absorption Peak of Corres. Diazonium Salt λ |
|---|---|---|---|---|---|---|---|---|
| 6 | $CH_3O$ | —N(5-ring) | $-CH_2CH(CH_3)_2$ | $-CH_2CH(CH_3)_2$ | | 91–93 | Example 1 | 431 |
| 7 | $CH_3O$ | —N(morpholino) | | | —N(morpholino) | 142–145 | do | 425 |
| 8 | $CH_3O$ | —N(6-ring) | | | —N(6-ring) | 112–115 | do | 420 |
| 9 | $CH_3O$ | —N(6-ring) | $-C_2H_5$ | $-C_6H_5$ | | 119–123 | do | 420 |
| 10 | $CH_3O$ | —N(6-ring) | | | —N(morpholino) | 118–120 | do | 418 |
| 11 | $CH_3O$ | —N(7-ring) | $-CH_3$ | $-CH_2\text{-O-}$ (furfuryl) | | 60–63 | do | 418 |
| 12 | $CH_3O$ | —N(5-ring) | | | —N(5-ring) | 82–85 | do | 430 |
| 13 | $CH_3O$ | —N(6-ring) | | | —N(6-ring) | 134–135 | do | 422 |
| 14 | $CH_3O$ | —N(6-ring) | | | —N(6-ring with 2,6-di-$CH_3$) | 127–130 | do | 425 |
| 15 | $CH_3O$ | —N(6-ring) | $-C_6H_{11}$ | $-C_6H_{11}$ | | 128–131 | Example 1 | 430 |
| 16 | $CH_3O$ | —N(morpholino) | $-C_6H_5$ | $-C_6H_5$ | | 163–167 | do | 425 |
| 17 | $CH_3O$ | —N(5-ring) | $-CH(CH_3)_2$ | $-CH_2C_6H_5$ | | 102–105 | do | 430 |
| 18 | $C_4H_9O$ | —N(morpholino) | $-CH(CH_3)_2$ | $-CH_2C_6H_5$ | | | Example 4 | 425 |
| 19 | $C_6H_5O\ C_2H_4O$ | —N(morpholino) | $-C_2H_5$ | $-C_6H_5$ | | | do | 425 |
| 20 | Chlorine | —N(6-ring) | $-CH_2CH(CH_3)_2$ | $-CH_2CH(CH_3)_2$ | | 96–98 | Example 5 | 425 |

EXAMPLE 41

The compound prepared in Example 26 was used to sensitize a base material, such as paper, by applying the following sensitizing solution:

| | |
|---|---|
| Water milliliters | 1000 |
| 2 - (N,N-diisobutylcarboxamido) - 4 - hexamethyleneimino - 5 - methoxybenzenediazonium chloride ZnCl$_2$ complex (0.03 mole) grams | 20.0 |
| Sodium 2,3 - dihydroxynaphthalene - 6 - sulfonate grams | 30.0 |
| Thiourea do | 50.0 |
| Citric acid do | 15.0 |
| Zinc chloride do | 60.0 |

The above solution was coated at the rate of 15 grams per square yard to produce a two-component diazotype paper developable in an alkaline medium (such as exposure to ammonia gas), enabling the azo-dye coupling reaction to proceed between the diazonium salt and the coupler, sodium 2,3-dihydroxynaphthalene-6-sulfonate. A dense blue azo-dye image was produced.

EXAMPLE 42

The stabilized diazonium salt prepared in Example 28 from the amine produced in Example 8 was used to prepare a one-component paper as follows.

Sensitizing solution:

| | |
|---|---|
| Water milliliters | 1000 |
| 2 - (hexamethyleneiminocarbonyl) - 4 - piperidino - 5 - methoxybenzenediazonium chloride SnCl$_4$ complex (0.03 mole) grams | 12.0 |
| Tartaric acid do | 50.0 |

Developer:

| | |
|---|---|
| Water milliliters | 1000 |
| Potassium tetraborate grams | 60.0 |
| Potassium hydroxide do | 7.5 |
| Phloroglucinol do | 5.5 |
| Resorcinol do | 4.5 |

The above sensitizing solution was applied to a suitable base support at the rate of 15 grams per square yard.

The light sensitive paper was exposed through a translucent or transparent original to actinic radiation. A reproduction of the original was then developed by applying the above developer solution to the latent diazo image, producing a brown azo-dye image of suitable density.

EXAMPLE 43

The stabilized diazonium salt prepared in accordance with Example 27 was employed to prepare a one-component copy by the method described in Example 42. Sixteen grams of 2-N-(3-azabicyclo[3.2.2]nonyl)carbonyl-4-morpholino-5-methoxybenzenediazonium chloride SnCl$_4$ complex was used in lieu of the diazonium salt of Example 42. The remaining components of the sensitizing solution and developer were unchanged. Upon exposure and development the paper produced a dense brown azo-dye image.

EXAMPLE 44

The one-component diazotype material prepared in Examples 42 and 43 may also be developed in a neutral pH environment of the following composition:

| | |
|---|---|
| Water milliliters | 1000 |
| Sodium benzoate grams | 24.0 |
| Sodium citrate do | 45.0 |
| Sodium formate do | 12.0 |
| Phloroglucinol do | 8.0 |

A dense black azo-dye was produced with either diazonium salt.

It will be appreciated that the ability of the diazonium compounds incorporated in sensitizing solutions and applied to a base support to undergo rapid photodecomposition, referred to in the art as "printing speed," is a most important property pertinent to its function as a reproduction medium. The diazotype materials in the foregoing examples are capable of much shorter periods of exposure than the diazotype materials known heretofore. Property of greater printing speeds is manifest when exposed to ultraviolet as well as visible light.

A comparative test of diazotype papers prepared with the diazonium salts of this invention and those containing a prior art material, 2,5-dibutoxy-4-morpholinobenzene-1-diazonium chloride SnCl$_4$ complex, with the same molar concentration of the sensitizing solutions, shows the former to be much faster printing.

The comparison involved exposing the particular diazotype material through a transparent original to both ultraviolet light and light in the visible range under controlled conditions. The ultraviolet light source was a mercury vapor lamp rated at 100 watts per lighted inch of lamp. The samples to be tested, together with the original, are moved past the mercury light source at variable rates of speed in a controlled path directing light onto the surface of the sheet from a fixed distance of 2 inches. The greater the speed the less the time of exposure and hence the exposure of the mercury lamp is reported in terms of feet per minute necessary to produce a copy of proper contrast, i.e., maximum decomposition in the background areas.

The response to visible light was measured with a 500-watt photoflood lamp operating in a 3400° K. color temperature which is manufactured by General Electric Company. Exposure tests in visible radiation were carried out at a distance of 3 inches and 6 inches from the sample.

The results of the tests are as follows:

| | U.V. Radiation (ft./min.) | Visible Light (seconds) | |
|---|---|---|---|
| | | 3 in. | 6 in. |
| Prior art | 44 | 5 | 8.5 |
| Example 41 material | 76 | 2.5 | 3.5 |
| Example 42 material | 76 | 2 | 3 |
| Example 43 material | 76 | 2 | 3 |

I claim:

1. The diazonium compound having one of the following general formulas:

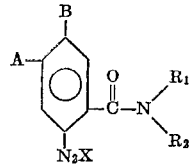

and

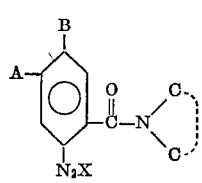

in which X is an anion; wherein A is lower alkoxy, lower alkyl, lower acyloxy, hydroxy, halogen; B is pyrrolidinyl, piperizinyl, morpholinyl, piperidinyl, hexamethyleneimine; R$_1$ is lower alkyl, phenyl, cyclohexyl, and lower alkyl substituted furan; R$_2$ is cyclohexyl, phenyl, phenyl substituted lower alkyl, lower alkyl; and

is a saturated cyclic amine residue selected from the group consisting of pyrrolidine, piperidine, lower alkyl substituted piperidine, hexamethyleneimine, -3-azabicyclo(3.2.2) nonane, morpholine, and lower alkyl substituted morpholine.

2. The diazonium compound is a 2-(N,N-di-n-butylcarboxamido)-4-morpholino - 5 - methoxybenzene diazonium compound.

3. The diazonium compound is a 2-(N,N-di-isobutyl-carboxamido)-4-morpholino-5-hydroxy benzene diazonium compound.

4. The diazonium compound is a 2-(N-isopropyl-N-benzylcarboxamido)-4-morpholino-5-acetoxy benzene diazonium compound.

5. The diazonium compound is a 2-N-isobutylcarboxamido-4-hexamethyleneimino-5-chloro benzene diazonium compound.

6. In light-sensitive diazotype material comprising a base support coated with a light-sensitive composition including a light-sensitive diazo compound having one of the following formulas:

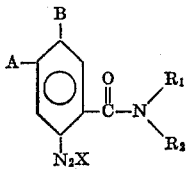

and

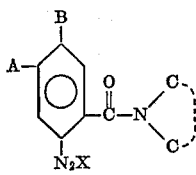

in which X is an anion; wherein A is lower alkoxy, lower alkyl, lower acyloxy, hydroxy, halogen; B is pyrrolidinyl, piperizinyl, morpholinyl, piperidinyl hexamethyleneimine; $R_1$ is lower alkyl, phenyl, cyclohexyl, and lower alkyl substituted furan; $R_2$ is cyclohexyl, phenyl, phenyl substituted lower alkyl, lower alkyl; and

is a saturated cyclic amine residue selected from the group consisting of pyrrolidine, piperidine, lower alkyl substituted piperidine, hexamethyleneimine, -3-azabicyclo (3.2.2)nonane, morpholine, and lower alkyl substituted morpholine.

7. The light-sensitive material described in claim 6 wherein the light-sensitive compound is the double salt of stannic chloride of a 2-N-(3-azabicyclo(3.2.2)nonylcarbonyl)-4-morpholino-5-methoxybenzene diazonium compound.

8. The light-sensitive material described in claim 6 wherein the light-sensitive compound is the double salt of stannic chloride of a 2-(hexamethyleneiminocarbonyl)-4-piperidino-5-methoxy benzene diazonium compound.

9. The light-sensitive material described in claim 6 wherein the light-sensitive compound is the double salt of zinc chloride of a 2-(N,N-diisobutylcarboxamido)-4-hexamethyleneimino-5-methoxy benzene diazonium compound.

References Cited

UNITED STATES PATENTS

| | | | |
|---|---|---|---|
| 2,405,523 | 8/1946 | Sease et al. | 96—75 |
| 3,338,713 | 8/1967 | Hendrickx et al. | 96—91 |

OTHER REFERENCES

"Index of German Reports on Diazotype Research of Kalle & Co., A.G.," General Aniline & Film Corp. Report No. RM168, received U.S. Patent Office: Apr. 6, 1956 (p. 15 relied on).

"PB25781 and PB44231" (pp. 115, 117, 306, 1106, 1109, 1513 relied on).

Kosar J.: "Light Sensitive Systems," Wiley & Son, New York, September 1965 (pp. 196–198 relied on).

Landau, R., et al.: "Diazo Compounds in the Photocopying Industry," Journal of Photo. Sci., vol. 13 (pp. 144–145 relied on), May 1965.

NORMAN G. TORCHIN, Primary Examiner

C. BOWERS, Assistant Examiner

U.S. Cl. X.R.

96—49; 260—141, 247.2, 248.5, 260, 268, 326.8, 347.3, 347.7. 558

UNITED STATES PATENT OFFICE
CERTIFICATE OF CORRECTION

Patent No. 3,463,639                             August 26, 1969

Evan S. Baltazzi

It is certified that error appears in the above identified patent and that said Letters Patent are hereby corrected as shown below:

Columns 5 and 6, in the table, heading of the last column, line 1 thereof, cancel "Infrared".

Signed and sealed this 21st day of April 1970.

(SEAL)
Attest:

Edward M. Fletcher, Jr.
Attesting Officer

WILLIAM E. SCHUYLER, JR.
Commissioner of Patents